(12) United States Patent
Shiizaki et al.

(10) Patent No.: US 8,737,315 B2
(45) Date of Patent: May 27, 2014

(54) COMMUNICATION APPARATUS AND ALLOCATION DETERMINING METHOD (75) Inventors: Kotaro Shiizaki, Kawasaki (JP); Takao Nakagawa, Kawasaki (JP); Hitoshi Yokoyama, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 709 days.

(21) Appl. No.: 12/394,457

(22) Filed: Feb. 27, 2009

(65) Prior Publication Data

US 2009/0219877 A1    Sep. 3, 2009

(30) Foreign Application Priority Data

Feb. 29, 2008  (JP) .................................. 2008-51157

(51) Int. Cl.
*H04W 4/00* (2009.01)
*H04J 3/24* (2006.01)
*H04L 12/66* (2006.01)
*H04L 12/28* (2006.01)
*H04W 72/08* (2009.01)
*H04W 72/10* (2009.01)

(52) U.S. Cl.
CPC ............ *H04W 72/085* (2013.01); *H04W 72/10* (2013.01)
USPC ........... 370/329; 371/331; 371/349; 371/352; 371/389

(58) Field of Classification Search
CPC ............................ H04W 72/085; H04W 72/10
USPC .......... 370/329, 331, 349, 352, 389; 375/340; 455/453, 67.11
See application file for complete search history.

(56) References Cited

U.S. PATENT DOCUMENTS 6,697,352 B1 * 2/2004 Ludwig et al. ................ 370/349
8,102,896 B2 * 1/2012 Pajukoski et al. ............. 375/146
8,228,936 B2 * 7/2012 Inoue et al. .................... 370/441

(Continued)

FOREIGN PATENT DOCUMENTS

EP        1 892 911       2/2008
JP      2000-224247       8/2000

(Continued)

OTHER PUBLICATIONS

Japanese Patent Office Notice of Reasons for Rejection for corresponding Japanese Patent Application No. 2008-051157, mailed Jan. 5, 2010. Partial English translation attached.

(Continued)

*Primary Examiner* — Jung Park
*Assistant Examiner* — Albert Shih
(74) *Attorney, Agent, or Firm* — Myers Wolin, LLC (57) ABSTRACT

A communication apparatus for communicating via a frame containing a plurality of first type blocks into which pilot information is inserted and a plurality of second type blocks into which control information or data is inserted, the communication apparatus including a channel estimation accuracy predicting unit for predicting channel estimation accuracy of each of the plurality of second type blocks based on channel estimate values of the plurality of first type blocks in the frame. The communication apparatus includes an allocation determining unit for determining an allocation based on priority information containing a priority of each type of the control information and data such that control information or data of a higher-priority type is inserted into a block among the plurality of second type blocks with higher channel estimation accuracy.

22 Claims, 8 Drawing Sheets

(56) References Cited

U.S. PATENT DOCUMENTS

| | | | | |
|---|---|---|---|---|
| 8,385,186 | B2* | 2/2013 | Ishii et al. | 370/208 |
| 2002/0191594 | A1* | 12/2002 | Itoh et al. | 370/352 |
| 2003/0203719 | A1* | 10/2003 | Barrett et al. | 455/67.11 |
| 2004/0100941 | A1* | 5/2004 | Lim et al. | 370/349 |
| 2004/0109424 | A1* | 6/2004 | Chheda | 370/331 |
| 2004/0218563 | A1* | 11/2004 | Porter et al. | 370/329 |
| 2006/0083234 | A1* | 4/2006 | Sung et al. | 370/389 |
| 2007/0140190 | A1 | 6/2007 | Rensburg et al. | |
| 2007/0286310 | A1* | 12/2007 | Fukuoka et al. | 375/340 |

FOREIGN PATENT DOCUMENTS

| | | |
|---|---|---|
| JP | 2002-078012 | 3/2002 |
| JP | 2004-236154 | 8/2004 |
| JP | 2005-286362 | 10/2005 |
| JP | 2007-116427 | 5/2007 |

OTHER PUBLICATIONS

NTT DoCoMo, Fujitsu, KDDI, Panasonic, Toshiba Corporation; Multiplexing Method for Orthogonal Reference Signals for E-UTRA Uplink; Agenda Item: 6.4.2; Document for: Discussion and Decision; R1-063307; 3GPP TSG RAN WG1 Meeting #47, Riga, Latvia, Nov. 6-10, 2006; [Ref.: Japanese Patent Office "Notice", mailed Jan. 5, 2010].

Nokia, Nokia Siemens Networks; "UL demodulation reference signal for EUTRA TDD type 2 frame structure"; Agenda item: 7.11.2; Document for: Discussion and decision; R1-072297; 3GPP TSG RAN WG1 Meeting #49, Kobe, Japan, May 7-11, 2007; [Ref.: Japanese Patent Office "Notice", mailed Jan. 5, 2010].

Ericsson, CATT, Hua Wei, Nokia, NSN, ZTE, RITT; "Further considerations on uplink reference signals for frame structure type 2"; Agenda Item: 5.11.2; Document for: Discussion and Decision; R1-073047; TSG-RAN WG1 #49bis, Orlando, Jun. 21-25, 2007; [Ref.: Japanese Patent Office "Notice", mailed Jan. 5, 2010].

"Motorola: ""Further Topics on Uplink DFT-SOFDM for E-UTRA"", 3GPP TSG RAN WG1 42bis, Oct. 10, 2005 (Oct. 10, 2005),-Oct. 14, 2005 (Oct. 14, 2005), pp. 1-24, XP002636308,Sophia-Antipolis CEDEX, France"; Dated Oct. 10, 2005; [Ref.: EESR dated May 25, 2011].

Extended European Search Report with Annex, issued for corresponding European Patent Application No. 09153925.4, mailed May 25, 2011. [Ref.: EESR dated May 25, 2011].

* cited by examiner

| BLOCK NUMBER | 1 | 2 | 3 | 4 | ... | 8 | 9 | 10 | 11 |
|---|---|---|---|---|---|---|---|---|---|
| FORMAT1 | 4 | 2 | 1 | 3 | ... | 5 | 6 | 8 | 10 |
| FORMAT2 | 7 | 5 | 9 | 11 | ... | 4 | 8 | 10 | 6 |
| ... | ... | ... | ... | ... | ... | ... | ... | ... | ... |

FIG. 4A

| PRIORITY | 1 | 2 | 3 | 4 | 5 |
|---|---|---|---|---|---|
| DATA TYPE | CONTROL INFORMATION (MCS) | CONTROL INFORMATION (ALLOCATION INFORMATION) | CONTROL INFORMATION (RETRANSMISSION RELATED INFORMATION) | NORMAL DATA | RETRANSMITTED DATA |

FIG. 4B

| PRIORITY | 1 | 2 | 3 | 4 | 5 |
|---|---|---|---|---|---|
| DATA TYPE | CONTROL INFORMATION (RETRANSMISSION RELATED INFORMATION) | CONTROL INFORMATION (ALLOCATION INFORMATION) | CONTROL INFORMATION (MCS) | RETRANSMITTED DATA | NORMAL DATA |

FIG. 5

| BLOCK NUMBER | 1 | 2 | 3 | 4 | ... | 8 | 9 | 10 | 11 |
|---|---|---|---|---|---|---|---|---|---|
| DATA TYPE | NORMAL DATA | CONTROL INFORMATION (MCS) | CONTROL INFORMATION (ALLOCATION INFORMATION) | NORMAL DATA | ... | CONTROL INFORMATION (RETRANSMISSION RELATED INFORMATION) | RETRANS-MITTED DATA | NORMAL DATA | NORMAL DATA |

FIG. 8
'RELATED ART'

| Sounding RS | LB1 | LB2 | Dem RS1 | LB3 | LB4 | LB5 | LB6 | LB7 | LB8 | Dem RS2 | LB9 | LB10 | LB11 |

COMMUNICATION APPARATUS AND ALLOCATION DETERMINING METHOD

CROSS-REFERENCE TO RELATED APPLICATION(S)

This application is based upon and claims the benefit of priority of the prior Japanese Patent Application No. 2008-51157, filed Feb. 29, 2008, the entire contents of which are incorporated herein by reference.

BACKGROUND

1. Field

The present invention relates to a communication apparatus that communicates using a frame of multiple blocks and an allocation determining method in the communication apparatus. The present invention also relates to a communication apparatus and an allocation determining method for improving the transmission efficiency.

2. Description of the Related Art

Currently, the 3GPP (The Third Generation Partnership Project), a mobile communication standards body, is developing the LTE (Long Term Evolution) specifications for next-generation mobile communications. In the development of the LTE specifications, an example format, as illustrated in FIG. 8, is defined as a frame format for uplink communications.

Figure 8:
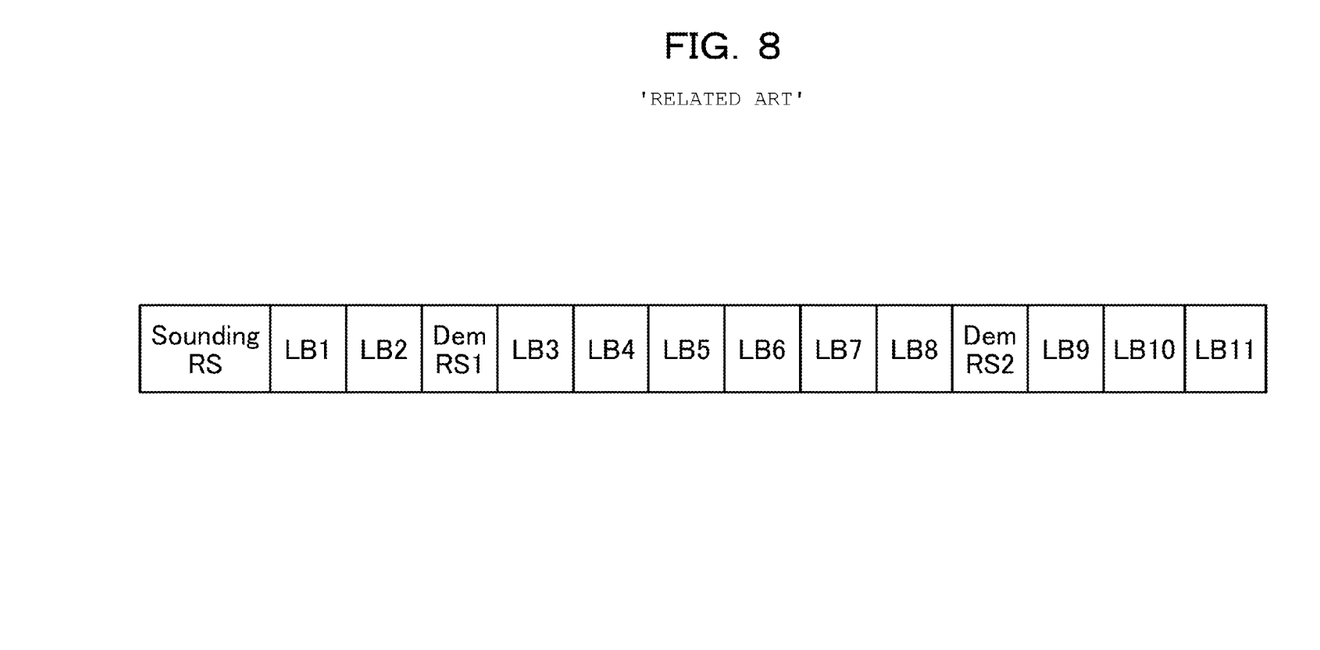
FIG. 8 is a diagram illustrating one example of a frame format.

As illustrated in FIG. 8, the frame format for uplink communications contains a plurality of blocks, in which data, control information or an RS (Reference Signal) is inserted into each block. An RS is pilot information that is used for estimating a channel. An RS includes a Sounding RS for measurement and a Dem RS for demodulation.

An RS is used to obtain a channel estimate value necessary to demodulate data or control information in a frame. The frame format in FIG. 8 shows that an RS is inserted into an SB (Short Block), and that the data or control information is inserted into an LB (Long Block). A communication apparatus performs processing, such as complementation or averaging, to determine a channel estimate value of an LB that is not adjacent to any SB.

However, even the complementation or the like cannot avoid variations in accuracy of channel estimation due to the LB position. That is, the channel estimation accuracy of LBs that are adjacent to an SB is the highest, and the channel estimation accuracy of the LB that is farther away from the SB is lower. For an LB with lower channel estimation accuracy, a transmission error is more likely to occur.

Japanese Laid-Open Patent Publication No. 2007-116427 proposes a technique to improve the transmission efficiency in communications via such a frame format. According to the technique, based on an assumption that an LB being nearer to pilot information has higher channel estimation accuracy, data of a user with higher propagation path property fluctuation velocity is allocated in an LB being near to pilot information, preventing degradation in receiving performance of the fast-moving user.

However, even the adjustment of an insertion position of data for each user, as disclosed in the related art above, cannot sufficiently improve the transmission efficiency. For example, if the control information for demodulation/decoding has not been normally transmitted and even if the data has been normally transmitted, it is still unavoidable that the data will be discarded because the demodulation/decoding of the data cannot be performed, resulting in a decrease in transmission efficiency.

Another example is that when much data needs to be retransmitted for some reason, if new data is normally transmitted but data to be retransmitted is not normally transmitted, many LBs will be used to retransmit the data. Because of this, fewer LBs can be used to transmit the new data, resulting in a decrease in transmission efficiency. The transmission efficiency decreases in both cases that much data needs to be retransmitted and that the retransmission related control information is not normally transmitted.

SUMMARY

According to an aspect of the embodiments of the invention, a communication apparatus for communicating via a frame containing a plurality of first type blocks into which pilot information is inserted and a plurality of second type blocks into which control information or data is inserted, the communication apparatus including a channel estimation accuracy predicting unit for predicting channel estimation accuracy of each of the second type blocks based on channel estimate values of the plurality of first type blocks in the frame. The communication apparatus includes an allocation determining unit for determining an allocation based on priority information containing a priority of each type of the control information and data such that control information or data of a higher-priority type is inserted into a block among the second type blocks with higher channel estimation accuracy.

The object and advantages of the embodiments will be realized and attained by means of the elements and combinations particularly pointed out in the claims.

It is to be understood that both the foregoing general description and the following detailed description are exemplary and explanatory only and are not restrictive of the invention, as claimed.

DESCRIPTION OF EMBODIMENTS

The following will describe a preferable embodiment of the invention in detail with reference to the attached drawings. In the following embodiment, an example is illustrated in which the disclosed technique is applied to a base transceiver station. The application is not limited to the base transceiver station, but the technique can be applied to various communication apparatuses.

First, there is described the configuration of a base transceiver station 10 being one example of a communication apparatus for executing an allocation determining method according to this embodiment. The allocation determining method according to this embodiment determines a priority depending on a type of data and control information and allocates data and information with a higher priority in an LB with higher channel estimation accuracy, thereby aiming to improve the transmission efficiency.

Figure 1:
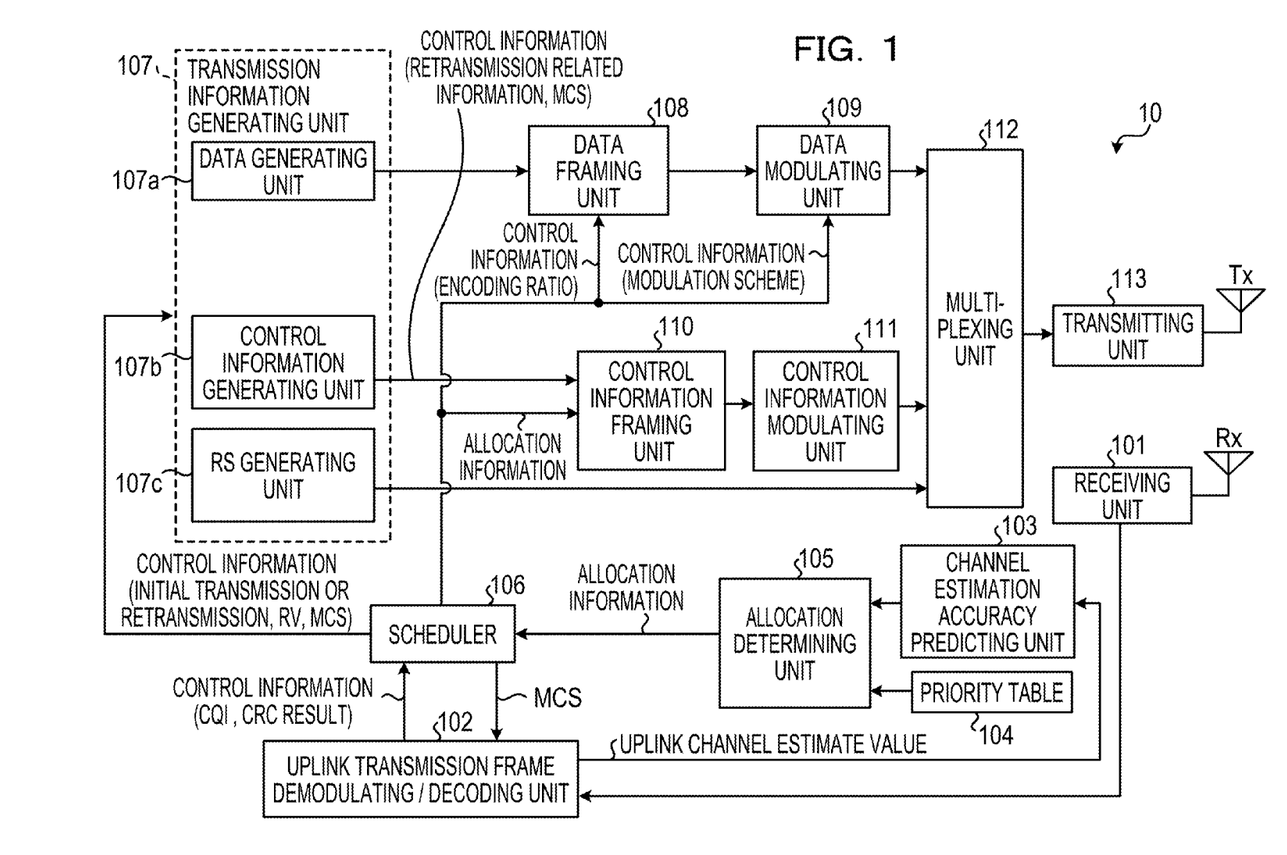
FIG. 1 is a block diagram illustrating the configuration of a base transceiver station according to an embodiment.

FIG. 1 is a block diagram illustrating the configuration of a base transceiver station 10 according to an embodiment. As illustrated in FIG. 1, the base transceiver station 10 includes a receiving unit 101, an uplink transmission frame demodulating/decoding unit 102, a channel estimation accuracy predicting unit 103, a priority table 104, an allocation determining unit 105, a scheduler 106, a transmission information generating unit 107, a data framing unit 108, a data modulating unit 109, a control information framing unit 110, a control information modulating unit 111, a multiplexing unit 112 and a transmitting unit 113.

The receiving unit 101 receives an uplink frame transmitted from another apparatus. The uplink transmission frame demodulating/decoding unit 102 demodulates and decodes control information and data contained in the uplink frame received by the receiving unit 101. The channel estimation accuracy predicting unit 103 predicts the channel estimation accuracy of each LB in a frame format based on an uplink channel estimate value of each SB obtained during the demodulation/decoding by the uplink transmission frame demodulating/decoding unit 102.

Figure 2:
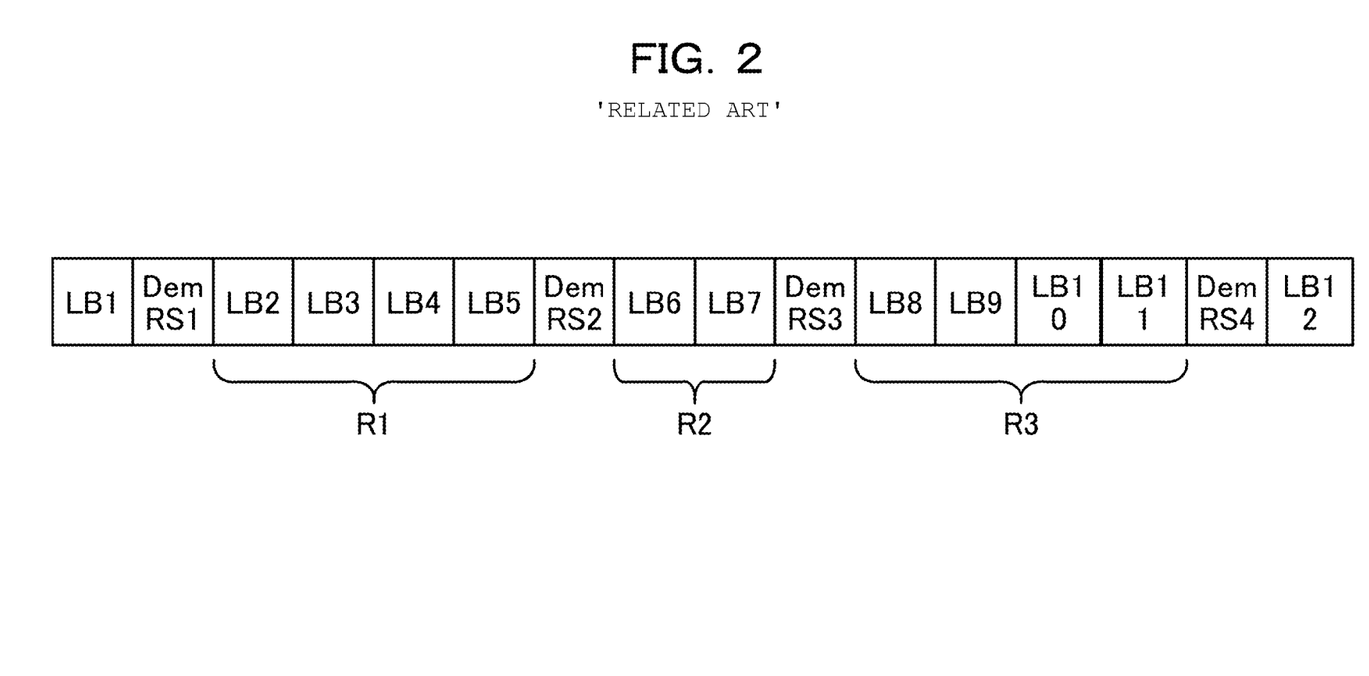
FIG. 2 is a diagram illustrating one example of a frame format.

The prediction of the channel estimation accuracy by the channel estimation accuracy predicting unit 103 will be described here in detail. The channel estimation accuracy predicting unit 103 obtains the variance of a channel estimate value to predict the channel estimation accuracy of each LB. For example, assume that a frame format is as illustrated in FIG. 2, and channel estimate values obtained by Dem RS1 to 4 have time components t and f. If the components t and f can be represented as hRS1 (t, f), hRS2 (t, f), hRS3 (t, f) and hRS4 (t, f), respectively, then variances of regions R1 to R3 included between the respective RSs are represented by the following (equation 1) to (equation 3), respectively:

$$\sigma_1^2 = \frac{1}{L \cdot N} \sum_{t,f}^{L,N} \left| \frac{h_{RS1}(t,f) + h_{RS2}(t,f)}{2} - h_{RS1}(t,f) \right|^2 \quad \text{(equation 1)}$$

$$\sigma_2^2 = \frac{1}{L \cdot N} \sum_{t,f}^{L,N} \left| \frac{h_{RS2}(t,f) + h_{RS3}(t,f)}{2} - h_{RS2}(t,f) \right|^2 \quad \text{(equation 2)}$$

$$\sigma_3^2 = \frac{1}{L \cdot N} \sum_{t,f}^{L,N} \left| \frac{h_{RS3}(t,f) + h_{RS4}(t,f)}{2} - h_{RS3}(t,f) \right|^2 \quad \text{(equation 3)}$$

Where L is the length of a block and N is the number of subcarriers configuring a multicarrier. The channel estimation accuracy predicting unit 103 determines that a region with a smaller variance value obtained in the above way is a region with higher channel estimation accuracy. The channel estimation accuracy can be predicted at any time, or can be predicted only when a frame format has somewhat been changed.

Figure 3:
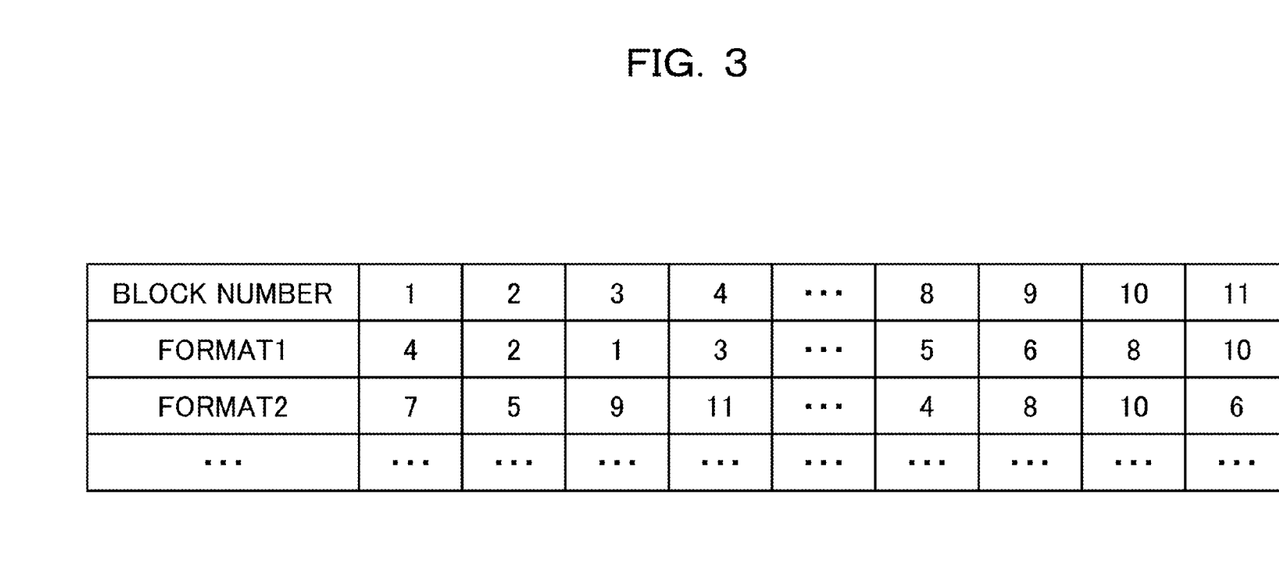
FIG. 3 is a diagram illustrating one example of a channel estimation accuracy information table.

Additionally, the channel estimation accuracy predicting unit 103 can predict the channel estimation accuracy of each LB through other approaches. For example, instead of dynamically predicting the channel estimation accuracy, the unit 103 can predict the channel estimation accuracy of each LB based on the channel estimation accuracy previously obtained. FIG. 3 is a diagram illustrating one example of a channel estimation accuracy information table for storing the channel estimation accuracy previously obtained. As illustrated in FIG. 3, the table stores the channel estimation accuracy of each LB previously obtained for every frame format assumed, based on, such as a distance from an RS, so that the channel estimation accuracy predicting unit 103 can handle a plurality of frame formats with a light load.

Figure 4A:
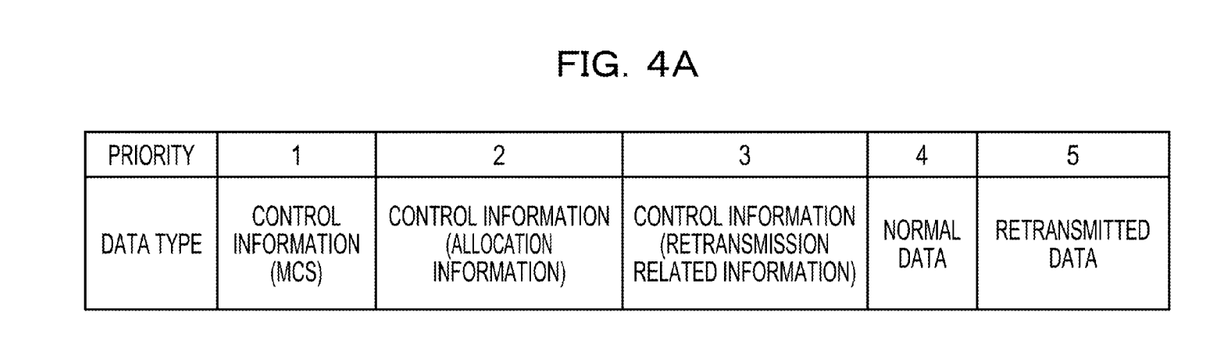
FIG. 4A is a diagram illustrating one example of a priority table in which the highest priority is given to information about demodulation/decoding.

Returning to the description of FIG. 1, the priority table 104 is a table in which a priority is defined for each type of data and control information. FIG. 4A illustrates one example of the priority table 104. In the example illustrated in FIG. 4A, the highest priority is given to MCS (Modulation and Coding Scheme) being control information for demodulation/decoding. Priorities gradually lower for allocation information being control information indicating which type of data or into which LB the control information is inserted, retransmission related information being control information for retransmission, normal data, and retransmitted data, in this order. Based on such priorities, MCS is inserted into an LB with high channel estimation accuracy, increasing the probability that data will be accurately demodulated/decoded.

Figure 4B:
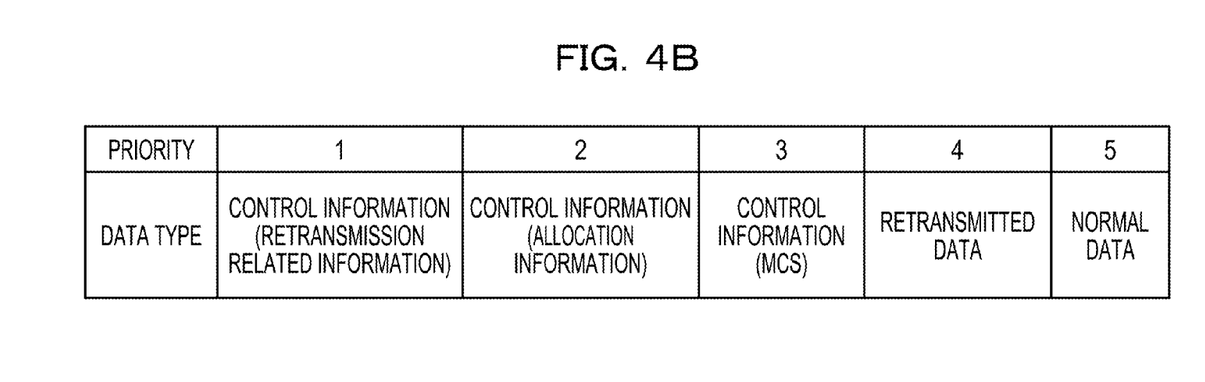
FIG. 4B is a diagram illustrating one example of a priority table in which the highest priority is given to information about retransmission.

FIG. 4B illustrates another example of the priority table 104. In the example illustrated in FIG. 4B, the highest priority is given to retransmission related information, and priorities gradually lower for allocation information, MCS, retransmitted data, and normal data, in this order. Based on such priorities, control information and data that are related to retransmission are inserted into an LB with high channel estimation accuracy, increasing the probability that retransmission will be completed at one time.

Additionally, various patterns other than the above examples are possible for how to classify and give priorities to control information and data. For example, the data is classified into types that need or do not need immediate processing, and a priority of data that needs immediate processing is set to high, thereby preventing data that needs immediate processing from causing a transmission error and the processing of the data from being not performed immediately.

Alternatively, the priority table 104 can store multiple patterns of priority information, and the allocation determining unit 105 can dynamically switch, depending on a status, which pattern should be selected. For example, a pattern is typically used to give a priority to MCS; when data to be retransmitted exceeds a pre-determined amount, a pattern is used to give a priority to retransmission related information and retransmitted data. Otherwise, when data that needs immediate processing exceeds a pre-determined amount, a pattern is used to give a priority to the data that needs immediate processing. Such switching can achieve optimal transmission efficiency in each status.

The allocation determining unit 105 determines into which LB in a frame format the control information or data is inserted, based on channel estimation accuracy of each LB obtained by the channel estimation accuracy predicting unit 103 and priority information stored in the priority table 104, and generates allocation information. More specifically, the allocation determining unit 105 determines an allocation such that a higher-priority type of control information or data is inserted into an LB with higher channel estimation accuracy.

Figure 5:
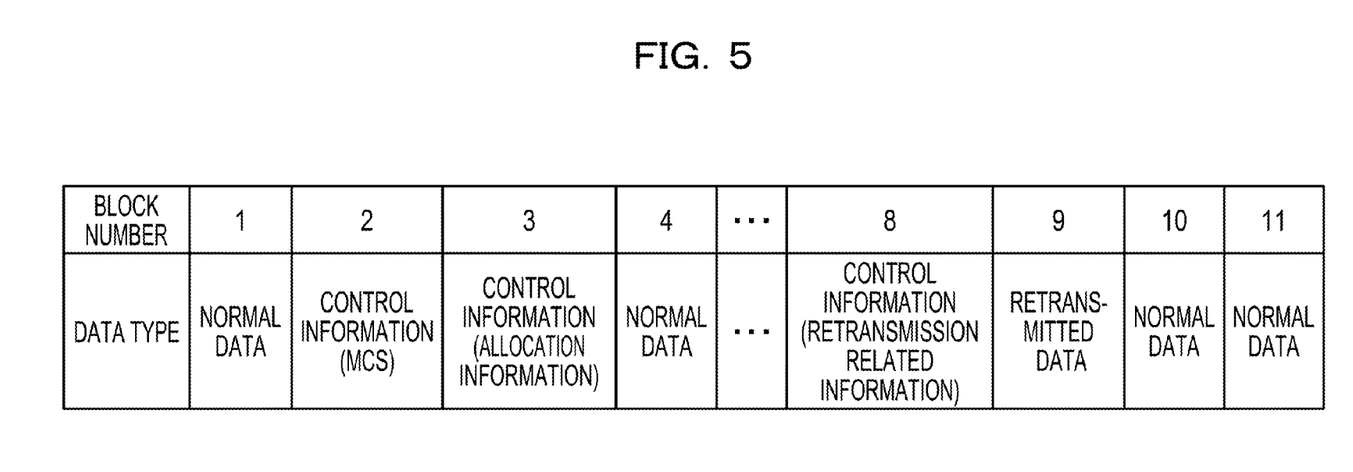
FIG. 5 is a diagram illustrating one example of allocation information.

FIG. 5 is a diagram illustrating one example of allocation information. As illustrated in FIG. 5, in the allocation information, information is set indicating which type of control information or data is inserted into each LB in a frame format.

The scheduler 106 executes various controls necessary for uplink and downlink communications, based on, such as a result of demodulation/decoding by the uplink transmission frame demodulating/decoding unit 102. For example, the scheduler 106 determines a demodulation and decoding scheme in an uplink communication, notifies the uplink transmission frame demodulating/decoding unit 102 as well as the transmission information generating unit 107 of MCS based on the determined scheme, and updates the MCS to be transmitted to a mobile terminal. Similarly, the scheduler 106 determines a demodulation and decoding scheme in a downlink communication, and notifies the data framing unit 108 and the data modulating unit 109 of the scheme.

The scheduler 106 further transfers allocation information generated in the allocation determining unit 105 to the control information modulating unit 111, and put the allocation information into a downlink frame. Thus the downlink frame contains the allocation information, so that the mobile terminal is notified of the allocation in a frame format determined by the allocation determining unit 105 and the uplink communication can reflect the allocation.

The transmission information generating unit 107 is a processing unit for generating information to be transmitted by the base transceiver station 10. The transmission information generating unit 107 includes a data generating unit 107a for generating data based on information transmitted such as from a transmission apparatus (not illustrated), a control information generating unit 107b for generating control information, and an RS generating unit 107c for generating an RS.

The data framing unit 108 attaches CRC (Cyclic Redundancy Check) to the data generated in the data generating unit 107a and encodes the result. The data modulating unit 109 modulates the data encoded by the data framing unit 108. The control information framing unit 110 combines MCS, retransmission related information, allocation information, etc., attaches CRC to the combination and encodes the result. The control information modulating unit 111 modulates the control information encoded in the control information framing unit 110.

The multiplexing unit 112 multiplexes the data modulated in the data modulating unit 109, the control information modulated in the control information modulating unit 111 and the RS generated in the RS generating unit 107c. The transmitting unit 113 transmits the signal multiplexed in the multiplexing unit 112 to the mobile terminal.

Figure 6:
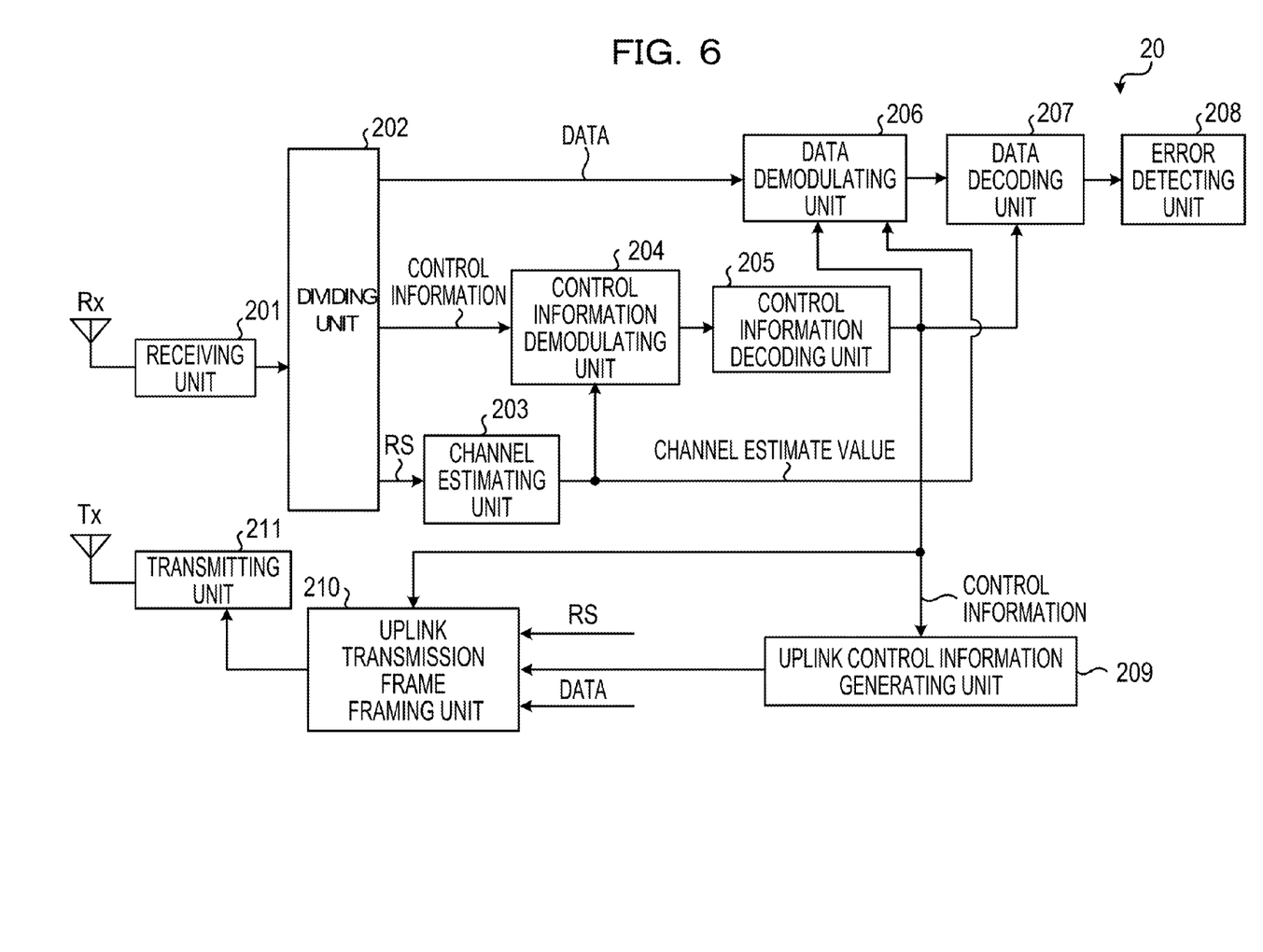
FIG. 6 is a block diagram illustrating the configuration of a mobile terminal corresponding to the base transceiver station according to an embodiment of the invention.

Next, the configuration of a mobile terminal 20 corresponding to the base transceiver station 10 illustrated in FIG. 1 will be described. FIG. 6 is a block diagram illustrating one example of the configuration of the mobile terminal 20. As illustrated in FIG. 6, the mobile terminal 20 includes a receiving unit 201, a dividing unit 202, a channel estimating unit 203, a control information demodulating unit 204, a control information decoding unit 205, a data demodulating unit 206, a data decoding unit 207, an error detecting unit 208, an uplink control information generating unit 209, an uplink transmission frame framing unit 210 and a transmitting unit 211.

The receiving unit 201 receives a frame transmitted from the base transceiver station 10. The dividing unit 202 divides the frame received in the receiving unit 201 into data, control information and an RS. The channel estimating unit 203 obtains a channel estimate value from the RS obtained by the division in the dividing unit 202.

The control information demodulating unit 204 demodulates the control information obtained by the division in the dividing unit 202 such as by the channel estimate value obtained in the channel estimating unit 203. The control information decoding unit 205 decodes the control information demodulated in the control information demodulating unit 204. The control information decoded in the control information decoding unit 205 contains allocation information.

The data demodulating unit 206 demodulates the data obtained by the division in the dividing unit 202 such as by the channel estimate value obtained in the channel estimating unit 203 or the control information decoded in the control information decoding unit 205. The data decoding unit 207 decodes the data demodulated in the data demodulating unit 206 such as by the control information decoded in the control information decoding unit 205. The error detecting unit 208 detects an error in the data decoded in the data decoding unit 207 such as by the CRC attached to the data.

The uplink control information generating unit 209 generates control information contained in an uplink frame based on, such as the control information decoded in the control information decoding unit 205. The uplink transmission frame framing unit 210 inserts the control information generated in the uplink control information generating unit 209, data generated in a processing unit (not illustrated) or an RS to an LB or SB to constitute an uplink frame, according to the allocation information contained in the control information decoded in the control information decoding unit 205. The transmitting unit 211 transmits the uplink frame constituted in the uplink transmission frame framing unit 210 to the base transceiver station 10.

Figure 7:
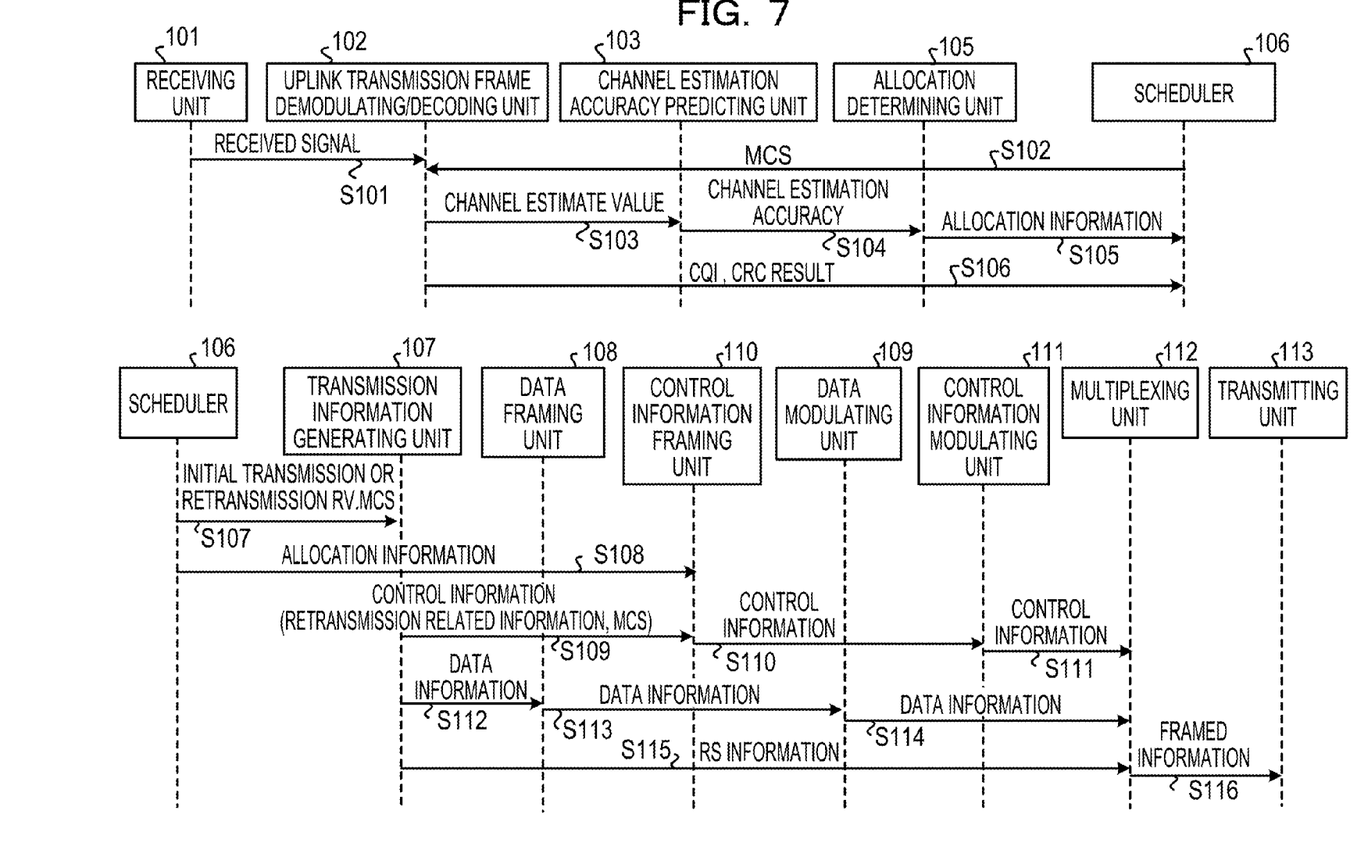
FIG. 7 is a sequence diagram illustrating a processing procedure of block insertion processing by the base transceiver station illustrated in FIG. 1.

Next, the operation of the base transceiver station 10 illustrated in FIG. 1 will be described. FIG. 7 is a sequence diagram illustrating a processing procedure of block insertion processing by the base transceiver station 10 illustrated in FIG. 1. As illustrated in FIG. 7, when the receiving unit 101 receives a frame, a received signal configuring the frame is transmitted to the uplink transmission frame demodulating/decoding unit 102 (step S101). Then, the uplink transmission frame demodulating/decoding unit 102 is notified of MCS indicating a manner of demodulation/decoding by the scheduler 106 (step S102).

The uplink transmission frame demodulating/decoding unit 102 demodulates/decodes a control signal and data contained in the received signal based on, such as the MCS, and notifies the channel estimation accuracy predicting unit 103 of each channel estimate value obtained through the process (step S103). The channel estimation accuracy predicting unit 103 predicts the channel estimation accuracy of each LB based on, such as the notified channel estimate value, and notifies the allocation determining unit 105 of the prediction result (step S104). The allocation determining unit 105 generates allocation information based on the notified channel estimation accuracy of each LB and priority information being set in the priority table 104, and transmits the allocation information to the scheduler 106 (step S105).

The uplink transmission frame demodulating/decoding unit 102 also notifies the scheduler 106 of information of the demodulation/decoding result (step S106) The scheduler 106 generates information to control uplink communication based on the information notified by the uplink transmission frame demodulating/decoding unit 102, and transmits the generated information to the transmission information generating unit 107 (step S107) The scheduler 106 also transfers the allocation information transmitted from the allocation determining unit 105 to the control information framing unit 110 (step S108).

The transmission information generating unit 107 generates control information based on the information transmitted from the scheduler 106, and transmits the control information to the control information framing unit 110 (step S109). The control information framing unit 110 combines the allocation information transmitted from the scheduler 106 and the control information transmitted from the transmission information generating unit 107 to generate control information for transmission, encodes and transmits the combination to the control information modulating unit 111 (step S110). The control information modulating unit 111 modulates and transmits the control information to the multiplexing unit 112 (step S111).

The transmission information generating unit 107 also generates data to be transmitted and transmits the data to the data framing unit 108 (step S112). The data framing unit 108 encodes and transmits the data to the data modulating unit 109 (step S113). The data modulating unit 109 modulates and transmits the data to the multiplexing unit 112 (step S114). The transmission information generating unit 107 also generates and transmits an RS to the multiplexing unit 112 (step S115).

The multiplexing unit 112 multiplexes the control information, data and RS into a downlink frame and delivers the frame to the transmitting unit 113 (step S116).

As described in the above, according to this embodiment, a type of control information or data with a higher priority is inserted into a block with higher channel estimation accuracy. Therefore, the probability that the type of control information or data with a higher priority is normally transmitted can be increased, increasing the efficiency in transmission of whole data.

Further, according to this embodiment of the invention, allocation determined based on a priority and channel estimation accuracy is transmitted to a corresponding apparatus as part of control information, so that the allocation determined by a relevant communication apparatus can be reflected in communication control for the corresponding apparatus.

Still further, according to this embodiment, channel estimation accuracy is predicted from the variance of a channel estimate value, so that for any frame format in which the pilot information is inserted at any position, the channel estimation accuracy can be accurately predicted.

Furthermore, according to this embodiment, a priority is switched depending on communication status, so that transmission efficiency can be kept high in any status.

Although the present invention has been described to be applied to uplink communications in the above embodiment, it can be applied to downlink communications similarly. The present invention is available for various communication schemes such as TDMA (Time Division Multiple Access), FDMA (Frequency Division Multiple Access) or CDMA (Code Division Multiple Access).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A communication apparatus comprising:
a channel estimation accuracy predicting unit for predicting channel estimation accuracy of each of a plurality of second type blocks based on channel estimate values of a plurality of first type blocks in a frame, the communication apparatus communicating via the frame that includes the plurality of first type blocks, into which pilot information is inserted, and the plurality of second type blocks, into which control information or data is inserted; and
an allocation determining unit for determining an allocation of the control information and the data based on priority information, the priority information containing a priority of each type of the control information and the data, such that the control information of a higher-priority type is inserted, in order of priority, into first blocks with higher channel estimation accuracy among said second type blocks, and the data of a higher-priority type is inserted into a second block among said second type blocks with higher channel estimation accuracy.

2. The communication apparatus according to claim 1, further comprising a transmitting unit for transmitting allocation information of the allocation determined by said allocation determining unit as part of the control information to a corresponding apparatus.

3. The communication apparatus according to claim 1, wherein said channel estimation accuracy predicting unit predicts channel estimation accuracy of the each of the plurality of second type blocks surrounded by two of said plurality of first type blocks based on variance of channel estimate values obtained in said two of said plurality of first type blocks.

4. The communication apparatus according to claim 1, wherein said allocation determining unit adopts different priority information depending on a number of pieces of control information and data of each type to be contained in said frame.

5. The communication apparatus according to claim 1, wherein said priority information is set such that control information necessary for demodulation and decoding has a higher priority than other control information.

6. The communication apparatus according to claim 1, wherein said priority information is set such that retransmission related control information and data has a higher priority than other control information and data.

7. The communication apparatus according to claim 1, wherein said priority information is set such that data that needs immediate processing has a higher priority than other data.

8. An allocation determining method comprising:
predicting channel estimation accuracy of each of a plurality of second type blocks based on channel estimate values of a plurality of first type blocks in a frame, a communication apparatus communicating via the frame that includes the plurality of first type blocks, into which pilot information is inserted, and the plurality of second type blocks, into which control information or data is inserted; and
determining, by a processor of the communication apparatus, an allocation of the control information and the data based on priority information, the priority information containing a priority of each type of the control information and the data, such that the control information of a higher-priority type is inserted, in order of priority, into first blocks with higher channel estimation accuracy among said second type blocks, and the data of a higher-priority type is inserted into a second block among said second type blocks with higher channel estimation accuracy.

9. The allocation determining method according to claim 8, further comprising transmitting allocation information of the determined allocation as part of the control information to a corresponding apparatus.

10. The allocation determining method according to claim 8, further comprising predicting channel estimation accuracy of the each of the plurality of second type blocks surrounded by two of said plurality of first type blocks based on variance of channel estimate values obtained in said two of said plurality of first type blocks.

11. The allocation determining method according to claim 8, further comprising adopting different priority information depending on a number of the control information and data of each type to be contained in said frame.

12. The allocation determining method according to claim 8, wherein said priority information is set such that control information necessary for demodulation and decoding has a higher priority than other control information.

13. The allocation determining method according to claim 8, wherein said priority information is set such that retransmission related control information and data has a higher priority than other control information and data.

14. The allocation determining method according to claim 8, wherein said priority information is set such that data that needs immediate processing has a higher priority than other data.

15. The communication apparatus according to claim 1, wherein the predicting channel estimation accuracy of each of said plurality of second type blocks further based on an channel estimation accuracy previously obtained.

16. The allocation determining method according to claim 8, wherein the predicting channel estimation accuracy of each of said plurality of second type blocks further based on a channel estimation accuracy previously obtained.

17. A communication apparatus comprising:
   a processor configured:
      to predict channel estimation accuracy of each of a plurality of second type blocks based on channel estimate values of a plurality of first type blocks in a frame, the communication apparatus communicating via the frame that includes the plurality of first type blocks, into which pilot information is inserted, and the plurality of second type blocks, into which control information or data is inserted; and
      to determine an allocation of the control information and the data based on priority information, the priority information containing a priority of each type of the control information and the data. such that the control information of a higher-priority type is inserted, in order of priority, into first blocks with higher channel estimation accuracy among said second type blocks, and the data of a higher-priority type is inserted into a second block among said second type blocks with higher channel estimation accuracy; and
   a transmitter coupled to the processor and configured to transmit the frame.

18. The communication apparatus according to claim 17, wherein the processor is configured to select the priority information from among a plurality of priority information different from each other, based on whether an amount of the each type of the data to be contained in the frame exceeds a given amount.

19. The communication apparatus according to claim 18, wherein the processor is configured to select the priority information that prioritizes the control information for retransmission and the data to be retransmitted when an amount of the data to be retransmitted exceeds a given amount.

20. The communication apparatus according to claim 18, wherein the processor is configured to select the priority information that prioritizes data that needs immediate processing exceeds when an amount of the data that needs immediate processing exceeds a given amount.

21. The communication apparatus according to claim 17, wherein the processor is configured to determine the allocation of the control information such that the control information of a lower-priority type is inserted into a third block with lower channel estimation accuracy than the first blocks among the second type blocks.

22. The communication apparatus according to claim 17, wherein the first blocks include different channel estimation accuracy of the higher channel estimation accuracy.

\* \* \* \* \*